T. W. LEAHY.
RAIL HANDLING TRUCK.
APPLICATION FILED JUNE 30, 1913.
1,099,926.
Patented June 16, 1914.
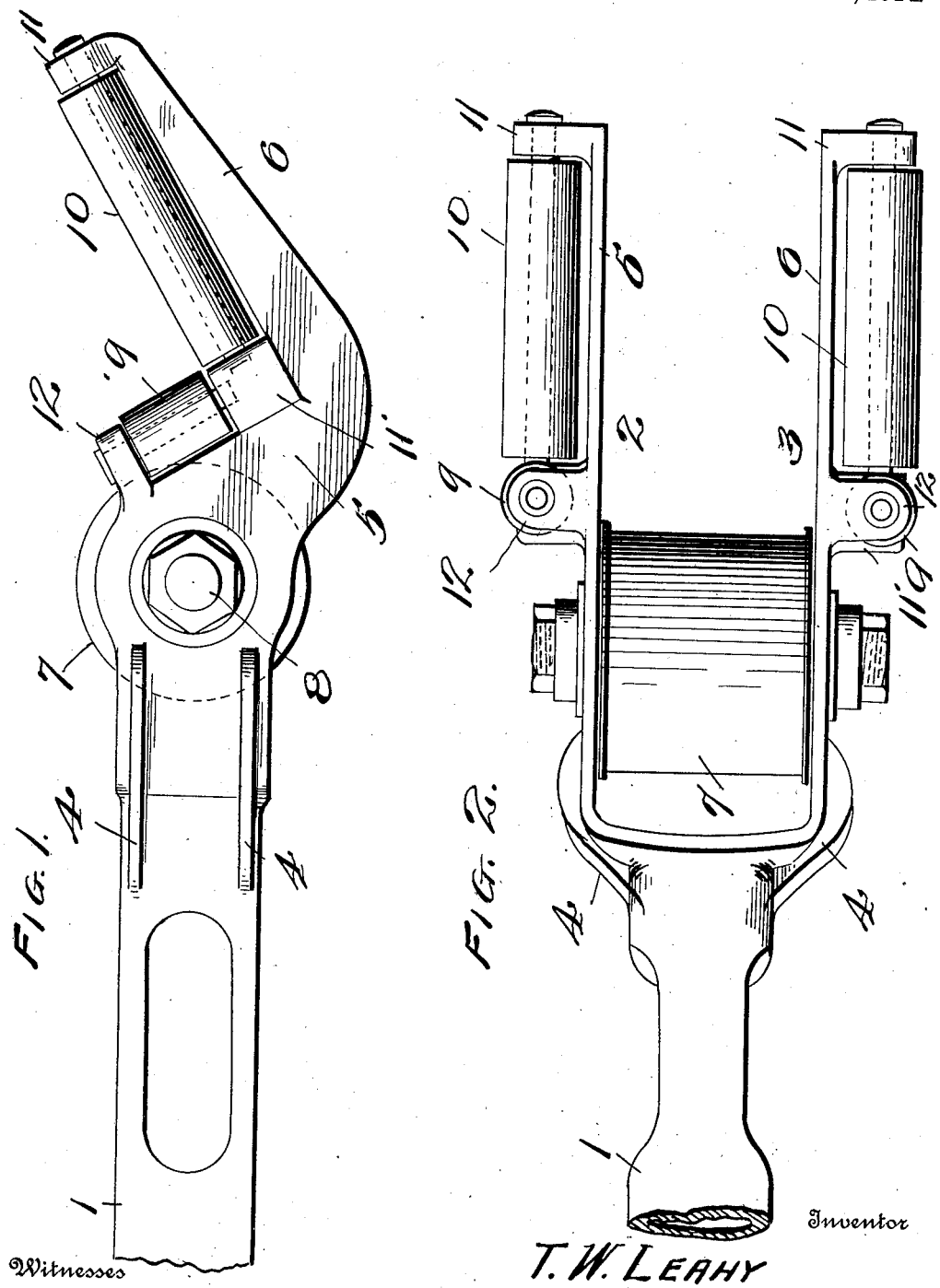

UNITED STATES PATENT OFFICE.

THOMAS WILLIAM LEAHY, OF SUPERIOR, WISCONSIN.

RAIL-HANDLING TRUCK.

1,099,926.  Specification of Letters Patent.  Patented June 16, 1914.

Application filed June 30, 1913. Serial No. 776,676.

*To all whom it may concern:*

Be it known that I, THOMAS W. LEAHY, a citizen of the United States, residing at Superior, in the county of Douglas and State of Wisconsin, have invented certain new and useful Improvements in Rail-Handling Trucks, of which the following is a specification.

The present invention relates to improvements in rail handling trucks, and is designed particularly to improve the construction and operation of this type of trucks as constructed according to the device illustrated in patent to Newburgh, dated January 21 1908 No. 877,111.

In the patented device referred to the truck provides means for quickly and easily handling heavy material in the loading or unloading of cars, boats and other carriers, and in industrial operations where the heavy material is to be moved to various locations.

The invention as embodied in the patented device comprised a lever bar equipped with a supporting wheel and certain rest rollers, and in actual use of the truck of this embodiment I have found that as so constructed the truck does not prove entirely satisfactory. Therefore, to cause the device to operate with more facility, and efficiency, and to reduce the first cost and increase the durability of the device I have made certain improvements as will be described.

In the accompanying drawings I have illustrated one complete example of the physical embodiment of my improvements constructed according to the best mode I have so far devised.

Figure 1 is a side elevation of my truck, the lever bar being omitted or broken away for convenience of illustration. Fig. 2 is a top plan view of Fig. 1.

The frame of the truck as will be noted is an integral or one piece casting of steel including the socket 1 for the lever bar and two forks 2 and 3 which branch out from the lower end of the socket and these parts are strengthened at their juncture by the side ribs 4, 4. The bifurcated frame, or forked ends are angular in shape comprising the short arms 5 and longer arms or extensions 6, and the forks are perforated near the base of the frame for the traveling roller or wheel 7 that is journaled therein and provided with ball bearings for its journal 8.

Beyond the traveler wheel are arranged two pairs of rollers as 9, 9, and 10, 10, the pairs being arranged perpendicular to each other. The longer rollers 10, 10, which become horizontal rollers when the truck is in operative position with a load, are journaled in the integral lugs 11, 11', which project laterally from the outer face of the frame, and the rollers 9, 9, which are in an approximately vertical position when the truck is in operative loaded position, are journaled in the lugs 11' and complementary lugs 12, 12.

In operation, the truck is designed to roll upon a railroad rail, the traveler 7 supporting the truck, and the truck held and guided by means of the lever bar (not shown) which is fitted into the socket 1, and controlled by manual power at the lever bar. The trucks are often used in pairs, one upon each rail and each operated by a man. In such case the load or rail is loaded onto the two alined trucks by moving it over the rollers 10, 10, and if the trucks are slightly tilted to the rear, with the front end up, the loading is facilitated as the rail also passes over the vertical rollers 9, 9. In this position, as for instance the position, or approximately the position of Fig. 1, the pairs of rollers 9 and 10 form a cradle through which the rail is easily moved until in proper position for transferring. When the rail is loaded into proper place on the trucks, they are moved to the desired point of unloading, and may be unloaded with ease by pushing them across the pairs of angularly disposed rollers as described. The use of the additional pair of rollers reduces the friction and wear on the moving parts and also upon the frame, and the fact that the entire truck frame is integral increases the durability of the truck.

From the above description taken in connection with the drawings it is evident that I have improved the original truck referred to hereinbefore both as to its construction and operation and have provided a device of enhanced value according to the improvements.

What I claim as new and desire to secure by Letters Patent is:—

1. A truck including a frame having spaced forks and an integral socket for a lever bar, a traveler wheel journaled between the forks, supporting rollers journaled in integral lugs at the outside of the frame forks with their axes in the line of travel of the truck, and additional supporting rollers journaled in integral lugs on the frame having their axes perpendicular to the first supporting rollers.

2. A truck including an integral bifurcated frame comprising a socket for a lever bar, a traveler wheel between the bifurcations of the frame, and pairs of supporting rollers journaled at the outside of the bifurcations with their axes in perpendicular relation.

In testimony whereof I affix my signature in presence of two witnesses.

THOMAS WILLIAM LEAHY.

Witnesses:
ROBERT BURNS NYE,
HENRY ALEXANDER HAMBLIN.

Copies of this patent may be obtained for five cents each, by addressing the "Commissioner of Patents, Washington, D. C."